(12) United States Patent
Sekiguchi

(10) Patent No.: US 7,177,749 B2
(45) Date of Patent: Feb. 13, 2007

(54) VEHICLE DRIVING SUPPORT APPARATUS

(75) Inventor: Mamoru Sekiguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 129 days.

(21) Appl. No.: 11/012,029

(22) Filed: Dec. 13, 2004

(65) Prior Publication Data
US 2005/0137775 A1   Jun. 23, 2005

(30) Foreign Application Priority Data
Dec. 18, 2003   (JP)   ............. 2003-421254

(51) Int. Cl.
G06F 7/00   (2006.01)
B60K 31/00   (2006.01)

(52) U.S. Cl. ....................................... 701/96
(58) Field of Classification Search ............ None
See application file for complete search history.

(56) References Cited

U.S. PATENT DOCUMENTS 5,710,565 A * 1/1998 Shirai et al. ............... 342/70
6,044,321 A * 3/2000 Nakamura et al. ......... 701/96
6,327,530 B1 * 12/2001 Nishimura et al. ......... 701/96
6,418,370 B1 * 7/2002 Isogai et al. ............... 701/96
2003/0093210 A1 * 5/2003 Kondo et al. ............... 701/96

FOREIGN PATENT DOCUMENTS

JP   07-032909 A   2/1995
JP   07-108849   *   4/1995

* cited by examiner

Primary Examiner—Michael J. Zanelli
(74) Attorney, Agent, or Firm—Darby & Darby

(57) ABSTRACT

In an automatic follow-up control executed by a traveling control unit, an intervehicle time is calculated by dividing an intervehicle distance by an own vehicle speed. When a preceding vehicle exists in the state that the automatic follow-up control is canceled and a state that the intervehicle time is set to a value within a set range continues for a set period of time, it is determined that the own vehicle is in a follow-up driving state executed by the driver. In this state, the driving information of the own vehicle operated by the driver is repeatedly obtained, and the target control values of the automatic follow-up control are learned based on the driving information. With the above operation, it is possible to learn necessary data accurately by a minimum amount of calculation and to execute the automatic follow-up control with a good drive feeling.

22 Claims, 12 Drawing Sheets

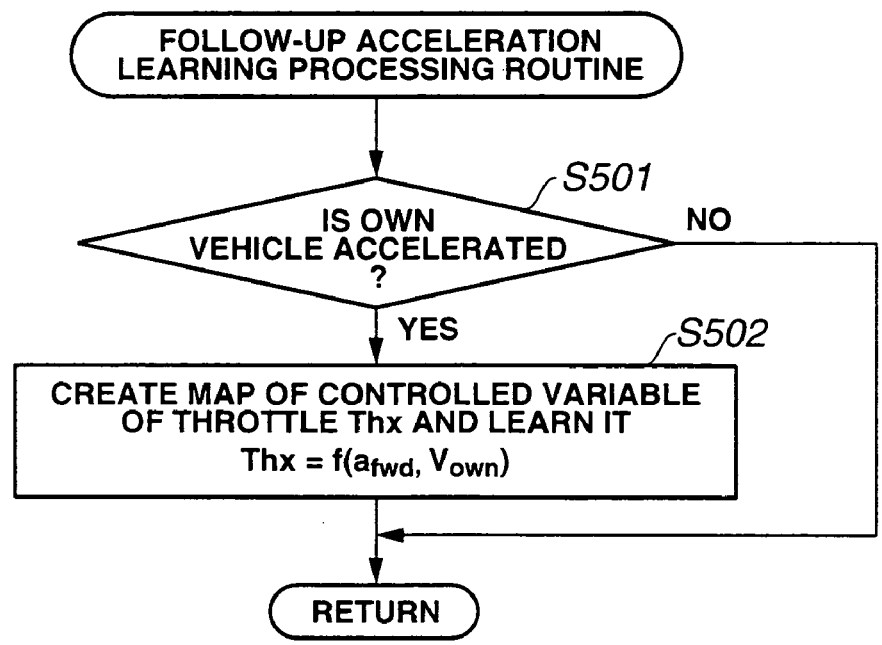
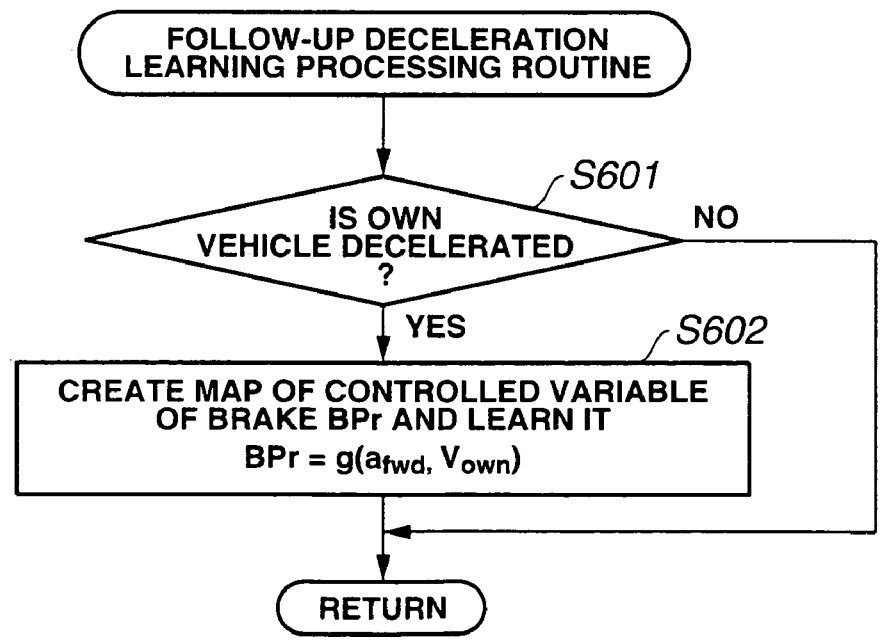

VEHICLE DRIVING SUPPORT APPARATUS

This application claims benefit of Japanese Application No. 2003-421254 filed on Dec. 18, 2003, the contents of which are incorporated by this reference.

BACKGROUND OF THE INVENTION

1. Field of the Invention

The present invention relates to a vehicle driving support apparatus which executes an automatic follow-up control to a preceding vehicle which travels ahead of an own vehicle and is detected by a stereoscopic camera, a single lens camera, a millimeter wave radar, and the like.

2. Description of Related Art

In recent years, there has been put into practical use a traveling control apparatus which detects forward traveling circumstances by cameras and the like mounted on a vehicle and detects a preceding vehicle from the traveling circumstance data to thereby execute a control to follow up the preceding vehicle or to keep an intervehicle distance between an own vehicle and the preceding vehicle constant.

Japanese Patent Application Publication No. 7-32909, for example, discloses a vehicle speed control apparatus which accumulates intervehicle distance data in a learning section, the intervehicle distance data being detected by a distance sensor in a non-automatic cruising mode in which a controller is not operated. Further, the vehicle speed control apparatus sets a target intervehicle distance based on the intervehicle distance data accumulated in the learning section in an automatic cruising mode in which the controller is operated so that an intervehicle distance type feedback control can be appropriately executed by reflecting the preference and the habit of a driver.

However, in the technology disclosed in Japanese Patent Application Publication No. 7-32909 described above, the intervehicle distance data is accumulated in the learning section when a relative speed of approximately zero continues between the preceding vehicle and the own vehicle for a predetermined period of time. Accordingly, even if, for example, the own vehicle travels at a medium speed on a highway while involuntarily decreasing the intervehicle distance due to a slight traffic jam, the decreased intervehicle distance is learned, and thus there is a possibility that the intervehicle distance, which is not preferable to execute an ordinary follow-up traveling control, is learned.

Further, in the learning conditions of Japanese Patent Application Publication No. 7-32909 described above, since the relative speed between the preceding vehicle and the own vehicle must be accumulated as data, the difference between the speed of the preceding vehicle and that of the own vehicle must be determined at all times by calculating the speed of the preceding vehicle, from which a problem arises in that an amount of calculation increases.

An object of the present invention, which was made in view of the above circumstances, is to provide a vehicle driving support apparatus which makes it possible to accurately learn necessary data by a minimum amount of calculation and can execute an automatic follow-up control with a good drive feeling that reflects the preference and the habit of the driver.

SUMMARY OF THE INVENTION

A vehicle driving support apparatus of the present invention that executes an automatic follow-up control to a preceding vehicle traveling ahead of an own vehicle includes intervehicle time calculation means for calculating an intervehicle time by dividing the intervehicle distance between the own vehicle and the preceding vehicle by an own vehicle speed, driver follow-up driving determination means for determining that the own vehicle is in a follow-up driving state executed by the driver when a state in which the intervehicle time is set to a value within a set range continues for a set period of time in the state that the automatic follow-up control is canceled, target control value learning means for obtaining the driving information of the own vehicle operated and learning a target control value of the automatic follow-up control based on the driving information when it is determined that the own vehicle is in the follow-up driving state executed by the driver, and automatic follow-up control execution means for outputting an actuation signal to a predetermined actuating section based on the learned target control value when the automatic follow-up control is executed.

The above and other objects, features and advantages of the invention will become more clearly understood from the following description referring to the accompanying drawings.

BRIEF DESCRIPTION OF THE DRAWINGS

FIG. 8 shows the flowchart of a follow-up acceleration learning processing routine;

FIG. 9 shows the flowchart of a follow-up deceleration learning processing routine;

DETAILED DESCRIPTION OF PREFERRED EMBODIMENTS

An embodiment of the present invention will be explained based on FIGS. 1 to 14.

Figure 1:
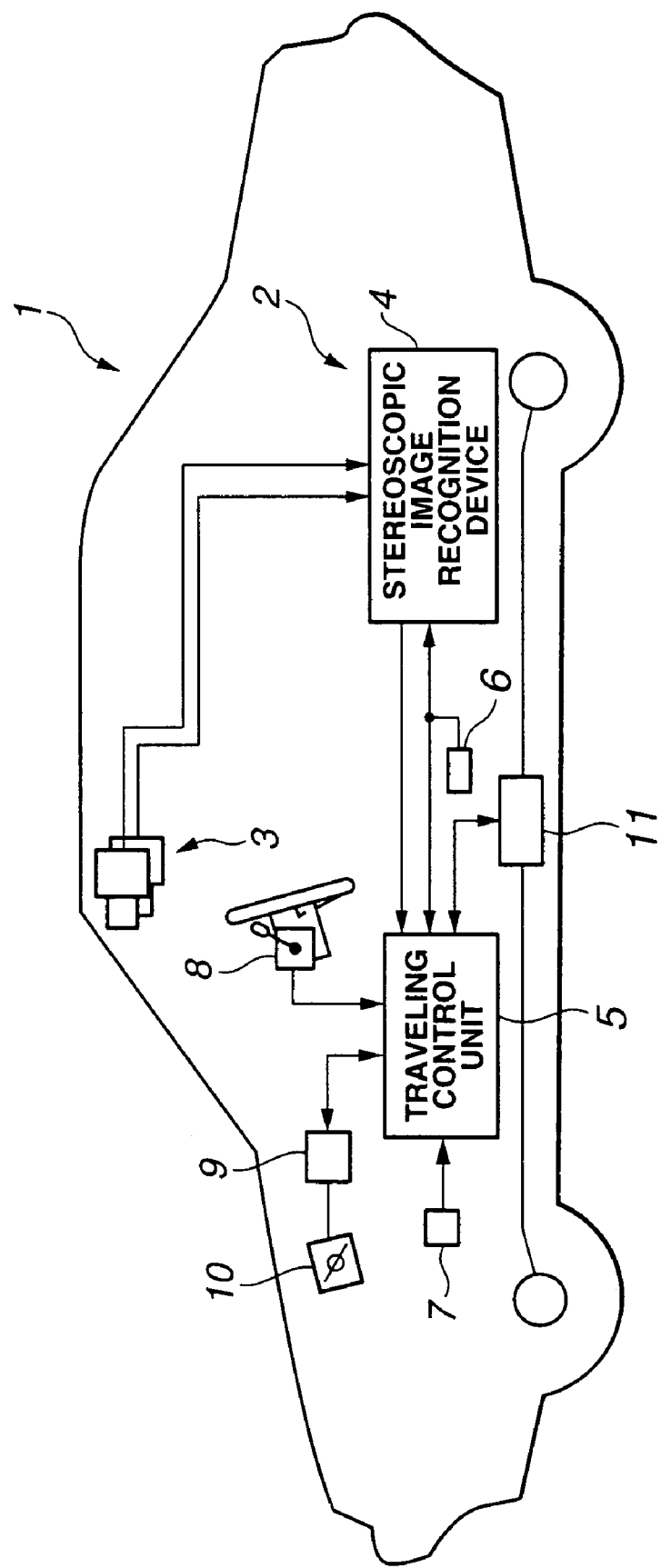
FIG. 1 is a schematic configurational view of a vehicle driving support apparatus mounted on a vehicle.

In FIG. 1, reference numeral 1 denotes a vehicle (own vehicle) such as an automobile and the like, and the own vehicle 1 has a cruise control system (Adaptive Cruise Control System, hereinafter abbreviated as "ACC") mounted thereon as an example of a vehicle driving support apparatus. The ACC system 2 mainly comprises a stereoscopic camera 3, a stereoscopic image recognition device 4, and a traveling control unit 5. In the ACC system 2, the own vehicle 1 basically travels keeping a vehicle speed set by a driver in a constant speed traveling control state in which no preceding vehicle exists, and when there is a preceding vehicle, the own vehicle 1 is controlled by an automatic follow-up control program which is shown in FIGS. 2 to 13 and will be explained later in detail. When the automatic follow-up control program determines that a follow-up driving is executed by the driver, the program repeatedly obtains vehicle driving information according to a manipulation of the driver and learns the target control values of the automatic follow-up control based on the vehicle driving information. In contrast, when the automatic follow-up control is executed in the existence of the preceding vehicle, the program executes an automatic brake control (including a follow-up stop control), an automatic acceleration control (including a follow-up start control), and the like based on the learned target control values.

The stereoscopic camera 3 comprises a pair of (right and left) CCD cameras using, for example, charge coupled devices (CCDs) as a stereoscopic optical system. These right and left CCD cameras are mounted in a front portion of a ceiling of a compartment with a predetermined distance therebetween, stereoscopically pick up an object outside the vehicle from different point of views and output the images of the object to the stereoscopic image recognition device 4.

Further, the own vehicle 1 is provided with a vehicle speed sensor 6 that detects an own vehicle speed $V_{own}$ which is output to the stereoscopic image recognition device 4 and a traveling control unit 5. Further, an ON-OFF signal of a brake pedal is input from a brake switch 7 of the own vehicle 1 to the traveling control unit 5.

The images from the stereoscopic camera 3 and the own vehicle speed $V_{own}$ from the vehicle speed sensor 6 are input to the stereoscopic image recognition device 4, which detects forward information such as solid object data and lane marker data ahead of the own vehicle based on the images from the stereoscopic camera 3 and estimates a traveling path of the own vehicle (own vehicle traveling path) therefrom. Then, the stereoscopic image recognition device 4 extracts a preceding vehicle traveling ahead of the own vehicle and outputs data such as a preceding vehicle distance (intervehicle distance) D, a preceding vehicle speed ((an amount of change of the intervehicle distance D)+(own vehicle speed $V_{own}$)) $V_{fwd}$, a preceding vehicle acceleration (differential value of the preceding vehicle speed $V_{fwd}$) $a_{fwd}$, the positions of stationary objects other than the preceding vehicle, a lane marker coordinate, a lane marker recognition distance, an own vehicle traveling path coordinate, and the like to the traveling control unit 5.

Here, the stereoscopic image recognition device 4 processes the images from the stereoscopic camera 3 as described below, for example. First, a pair of stereoscopic images, which are located in the circumstances in the traveling direction of the own vehicle 1 and taken by the CCD cameras of the stereoscopic camera 3 is subjected to processing for obtaining distance information over the entire image from the deviation amount between corresponding positions according to the principle of trianguration, and a distance image representing three-dimensional distance distribution is created on the basis of the distance information. Then, lane marker data, side wall data such as guardrails, curbs, and the like provided along the road, and solid object data such as vehicles and the like, are extracted on the basis of the distance image by means of the known grouping process and the like by referring to the three-dimensional road profile data, solid object data and the like stored beforehand. In the solid object data, the distance to a solid object and the change of the distance with respect to a time (the relative speed of the solid object to the own vehicle 1) are determined. In particular, vehicles, which travel at a predetermined speed in approximately the same direction as the own vehicle 1 are extracted as preceding vehicles from the vehicles traveling on the own vehicle traveling path at positions nearest to the own vehicle 1. Note that, among the preceding vehicles, a vehicle which approaches the own vehicle 1 at approximately the same relative speed as the own vehicle speed $V_{own}$ is recognized as a preceding vehicle braked to a stop.

The traveling control unit 5 realizes a constant speed traveling control function for executing a constant speed traveling control so that a traveling speed operated and set by the driver is kept and also realizes an automatic follow-up control function shown in FIGS. 2 to 13 described later. The traveling control unit 5 is connected with a constant speed traveling switch 8 comprising a plurality of switches operated by a constant speed traveling selector lever provided on the side surface of a steering column, the stereoscopic image recognition device 4, the vehicle speed sensor 6, the brake switch 7, and the like.

The constant speed traveling switch 8 comprises a vehicle speed setting switch that sets a target vehicle speed at a constant speed traveling, a coast switch that mainly changes the target vehicle speed in a descending direction, a resume switch that mainly changes the target vehicle speed in an ascending direction, and the like. Further, a main switch (not shown), which turns on and off the constant speed traveling control and the automatic follow-up control, is disposed in the vicinity of the constant speed traveling selector lever.

When the driver turns on a main switch, not shown and sets a desired vehicle speed by operating the constant speed traveling selector lever, a signal indicative of the desired vehicle speed is input from the constant speed traveling switch 8 to the traveling control unit 5. Then, a signal is output to a throttle valve controller 9 to converge the vehicle speed detected by the vehicle speed sensor 6 to the vehicle speed set by the driver, thereby an opening degree of a throttle valve 10 is subjected to a feedback control. As a result, the own vehicle 1 can travel at a constant speed automatically. Otherwise, a deceleration signal is output to an automatic brake controller 11 to thereby automatically actuate a brake.

Further, when the traveling control unit 5 executes the constant speed traveling control and the stereoscopic image recognition device 4 recognizes a preceding vehicle, the constant speed traveling control can be automatically shifted to the automatic follow-up control to be described later under predetermined conditions.

In the automatic follow-up control executed by the traveling control unit 5, an intervehicle time $T_d$ is calculated by dividing the intervehicle distance D between the own vehicle 1 and a preceding vehicle by the own vehicle speed $V_{own}$. When a preceding vehicle exists in the state that the automatic follow-up control is cancelled (for example, the main switch is turned off), it is determined that the own vehicle is in the follow-up driving state executed by the driver when a state in which the intervehicle time $T_d$ is set to a value within a set range continues for a set period of time. And when the follow-up driving state executed by the driver is determined, the driving information of the own vehicle according to the operation by the driver is repeatedly obtained, and the target control values of the automatic follow-up control are learned based on the driving information of the own vehicle. Further, when the automatic follow-up control is executed in the state that the main switch is turned on, an actuation signal is output to the throttle valve controller 9 and the automatic brake controller 11 based on the learned target control values. Note that the constant speed traveling control function and the automatic follow-up control function are automatically canceled when the driver presses the brake or when the own vehicle speed $V_{own}$ exceeds a preset upper limit value. That is, the traveling control unit 5 comprises functions as intervehicle time calculation means, driver follow-up driving determination means, target control value learning means, and automatic follow-up control execution means.

Figure 2:
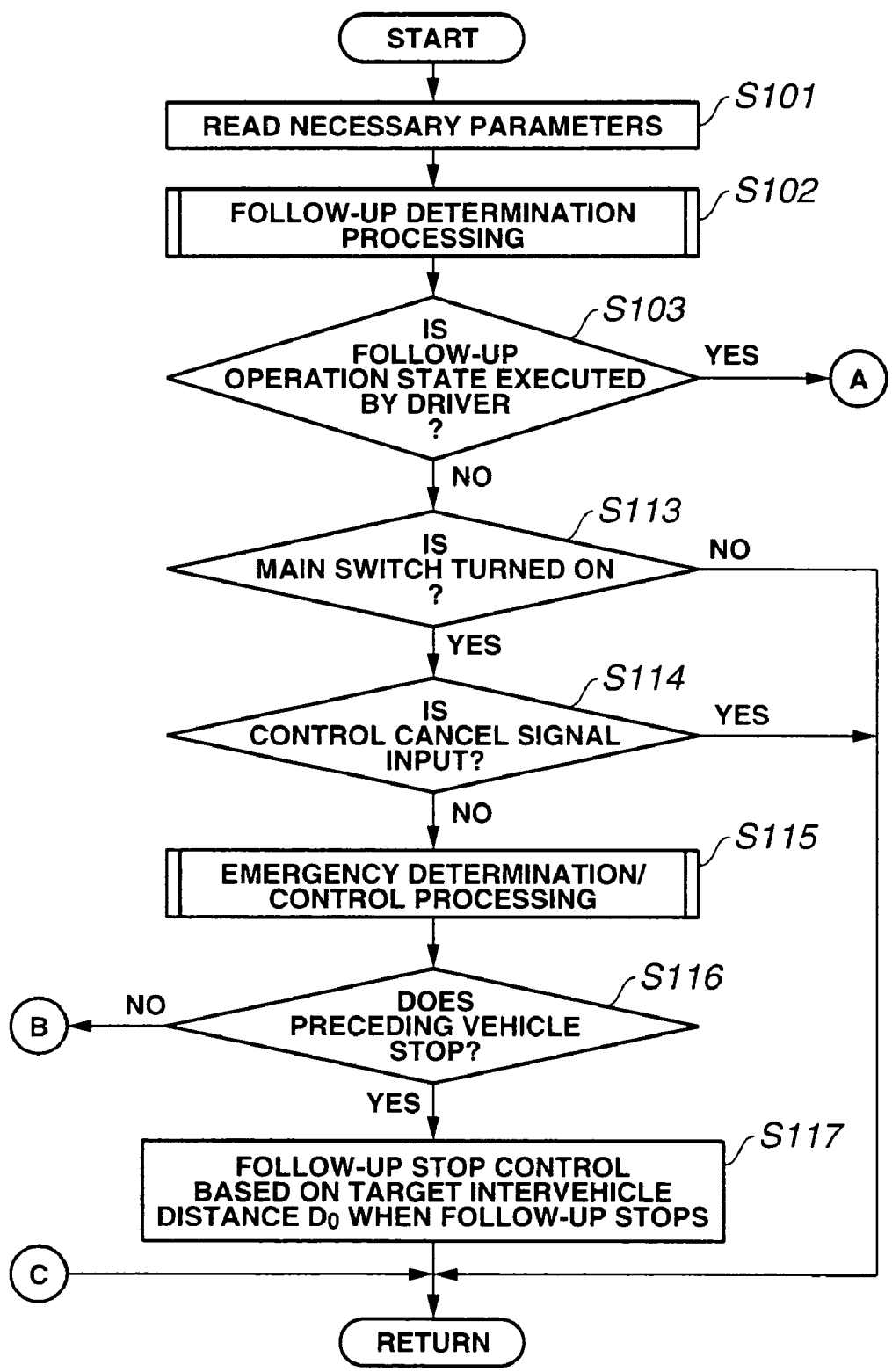
FIG. 2 shows a flowchart of an automatic follow-up control program.
Figure 3:
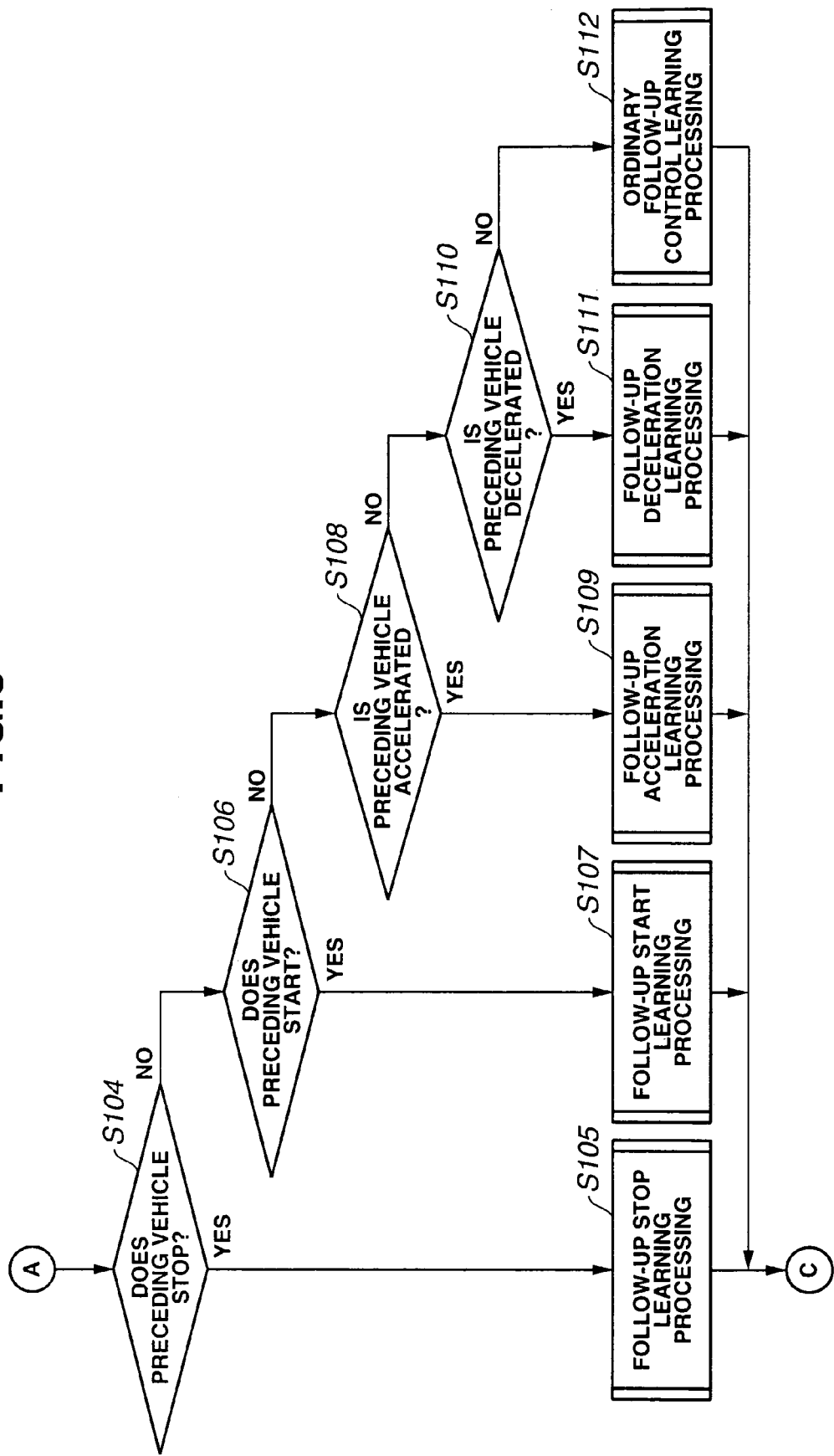
FIG. 3 is the flowchart following from the flowchart of FIG. 2.
Figure 4:
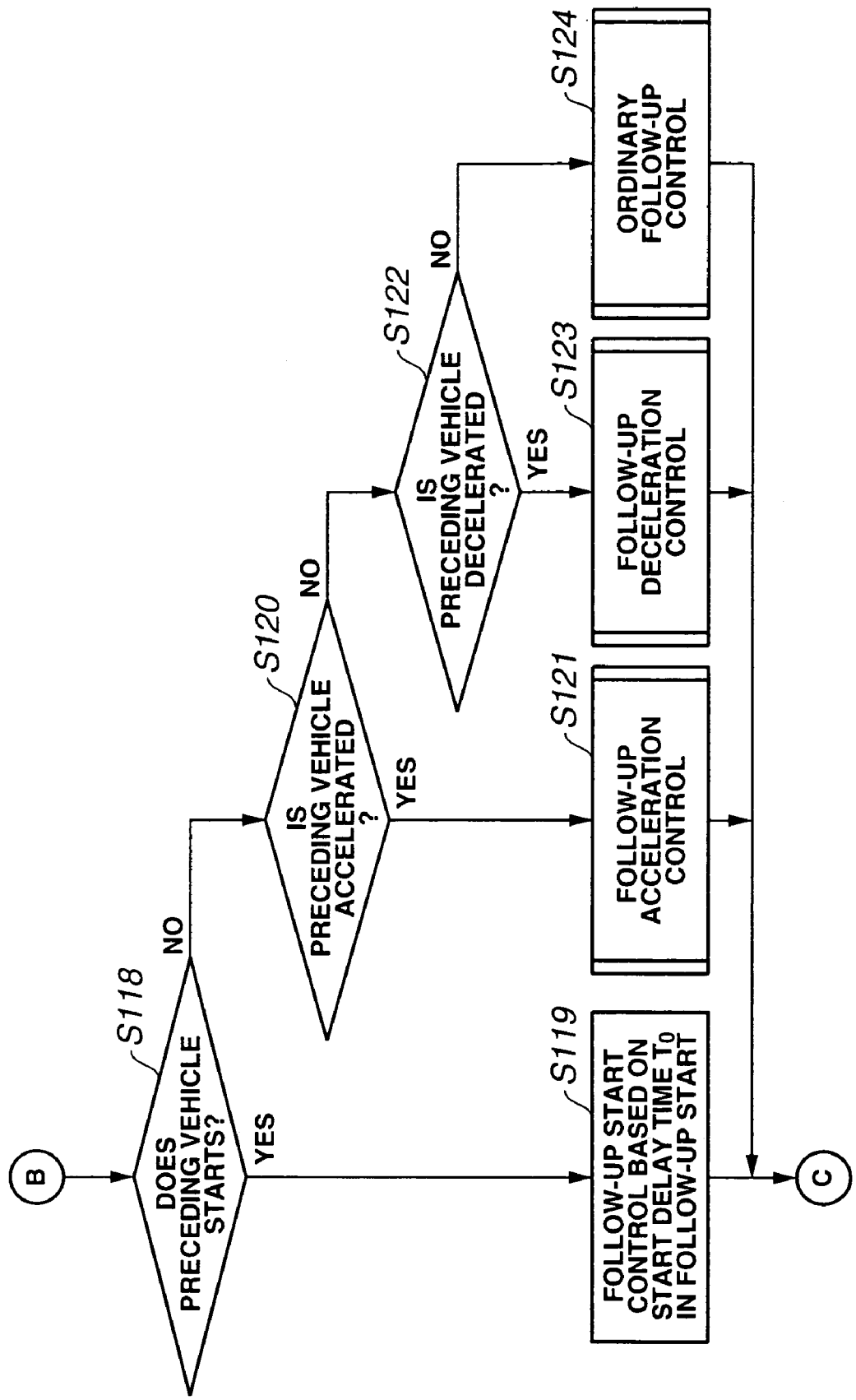
FIG. 4 shows the flowchart following from the flowchart of FIG. 2.

More specifically, as shown in FIG. 2, first, the automatic follow-up control execution control unit 5 reads necessary parameters at step (hereinafter, abbreviated as "S") 101. Thereafter, the process goes to S102 at which follow-up determination processing is executed.

Figure 5:
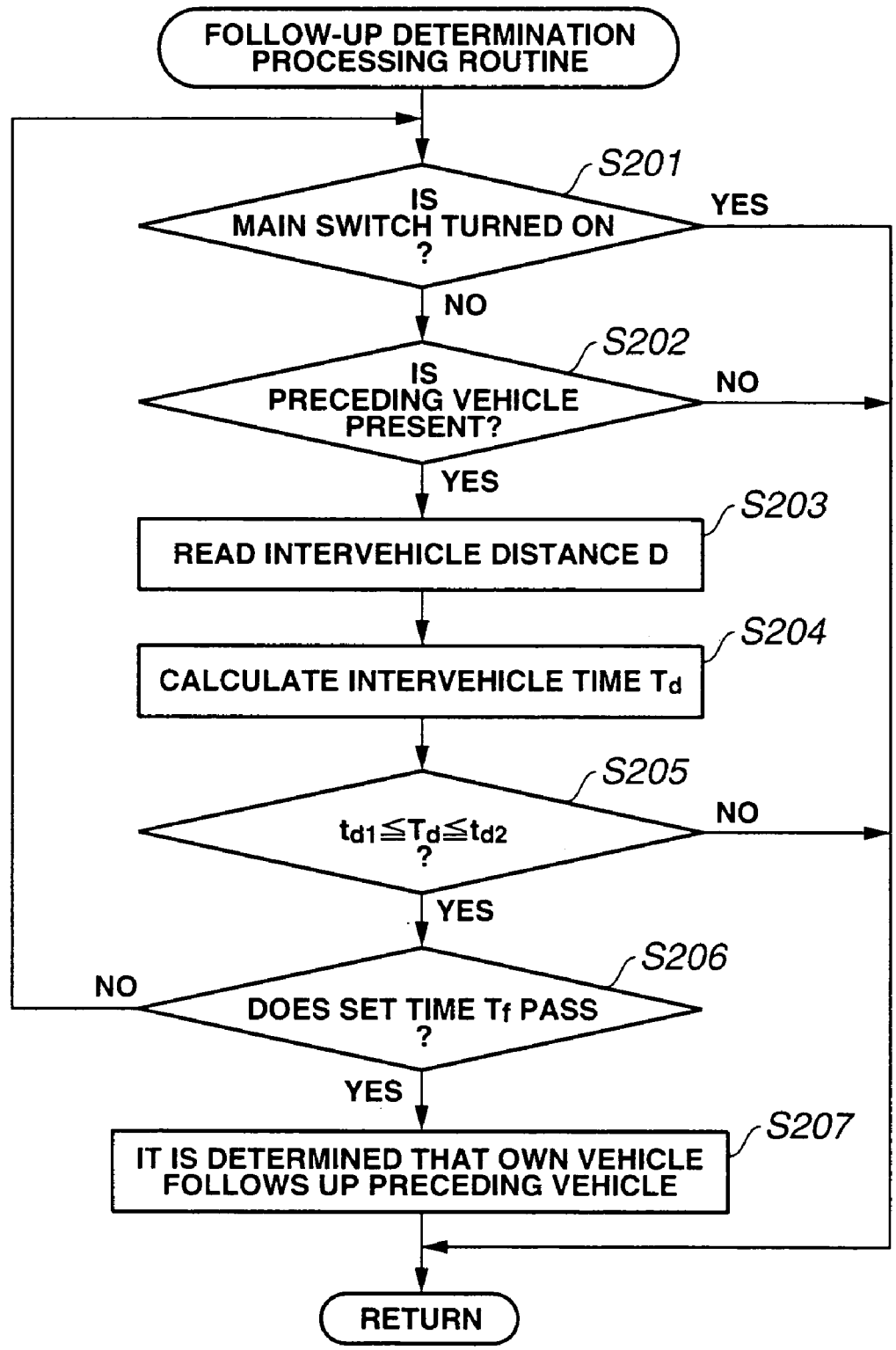
FIG. 5 shows the flowchart of a follow-up determination processing routine.

As shown in FIG. 5, in the follow-up determination processing, first, whether or not the main switch is turned on is determined at S201, and when the main switch is turned on and the automatic follow-up control is executed, the process exits from the routine as it is, whereas when the main switch is turned off and the automatic follow-up control stops, the process goes to S202.

When the process goes to S202 from step 201 in the state that the automatic follow-up control stops, it is determined whether or not a preceding vehicle exists, and when the preceding vehicle does not exist, the process exits from the routine as it is.

Inversely, when the preceding vehicle exists, the process goes to S203 at which the intervehicle distance D is read. Then, the process goes to S204 at which the intervehicle time $T_d$ (=(intervehicle distance D/(own vehicle speed $V_{own}$) is calculated (when the own vehicle speed $V_{own}$ is 10 km/h or less, it is set to 10 km/h), and the process goes to S205.

It is determined at step 205 whether or not the intervehicle time $T_d$ calculated at S204 has a value within a preset range, i.e. $t_{d1} \leq T_d \leq t_{d2}$ so that the intervehicle time $T_d$ can be flexibly determined in consideration of the personal differences of respective drivers, and when the intervehicle time $T_d$ is outside of the range, the process escapes from the routine. Inversely, when the intervehicle time $T_d$ is within the range, the process goes to S206 at which whether or not the state continues for a set period of time $T_f$.

When the set period of time $T_f$ passes as a result of determination at S206, the process goes to S207 at which it is determined that the driver operates the own vehicle 1 following up the preceding vehicle at the time, and the process escapes from the routine. When the set period of time $T_f$ does not yet pass as the result of determination at S206, processing is repeated from S201.

After the follow-up determination processing is executed at S102 as described above, the process goes to S103 at which whether or not the driver operates the own vehicle 1 following up the preceding vehicle is determined with reference to the result of determination at S102.

When it is determined that the driver operates the own vehicle 1 following up the preceding vehicle as the result determination at S103, the process goes to S104 at which whether or not the preceding vehicle stops is determined, and when the preceding vehicle stops, the process goes to S105 at which follow-up stop learning processing is executed, and the process exits from the program.

Figure 6:
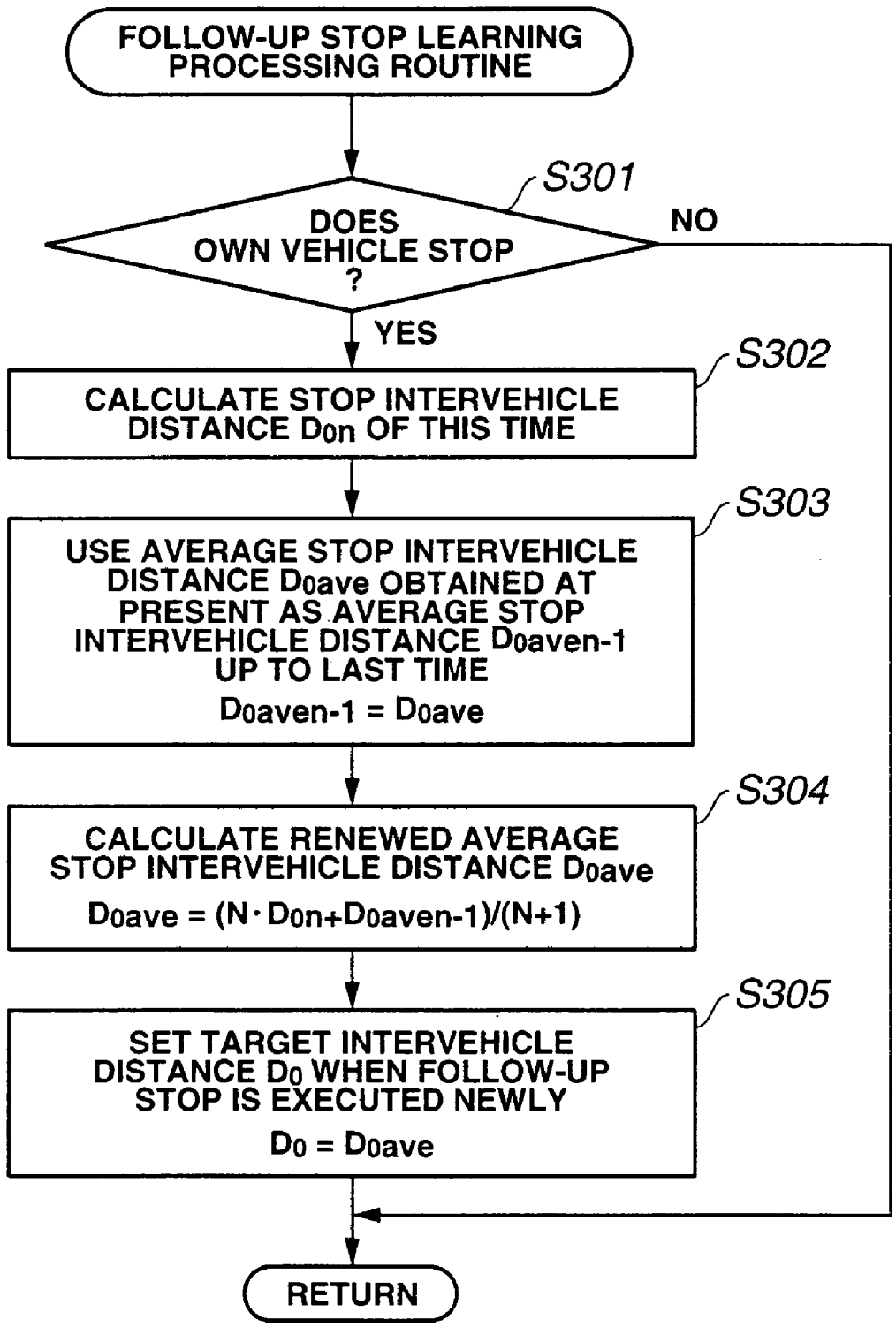
FIG. 6 shows the flowchart of a follow-up stop learning processing routine.

As shown in FIG. 6, in the follow-up stop learning processing executed at S105, first, whether or not the own vehicle 1 stops (subsequently to the preceding vehicle) is determined at S301, and when the own vehicle 1 does not stop, the process escapes from the routine as it is, whereas when the own vehicle 1 stops, the process goes to S302.

At S302, a stop intervehicle distance $D_{0n}$ at this time is calculated, then the process goes to S303 at which an average stop intervehicle distance $D_{0ave}$ obtained at the time (stored in a memory) is used as an average stop intervehicle distance $D_{0aven-1}$ up to last time ($D_{0aven-1}=D_{0ave}$).

Next, the process goes to S304 at which a renewed average stop intervehicle distance $D_{0ave}$ is calculated by, for example, the following weighted average.

$$D_{0ave}=(N \cdot D_{0n}+D_{0aven-1})/(N+1)$$

Then, the process goes to S305 at which a renewed target intervehicle distance $D_0$ at the time follow-up is stopped is set as $D_{0ave}$ obtained at S304 ($D_0=D_{0ave}$), and the process escapes from the routine.

In contrast, when the preceding vehicle does not stop as a result of determination at S104, the process goes to S106 at which whether or not the preceding vehicle starts is determined, and when the preceding vehicle starts, the process goes to S107 at which follow-up start learning processing is executed, and the process exits from the routine.

Figure 7:
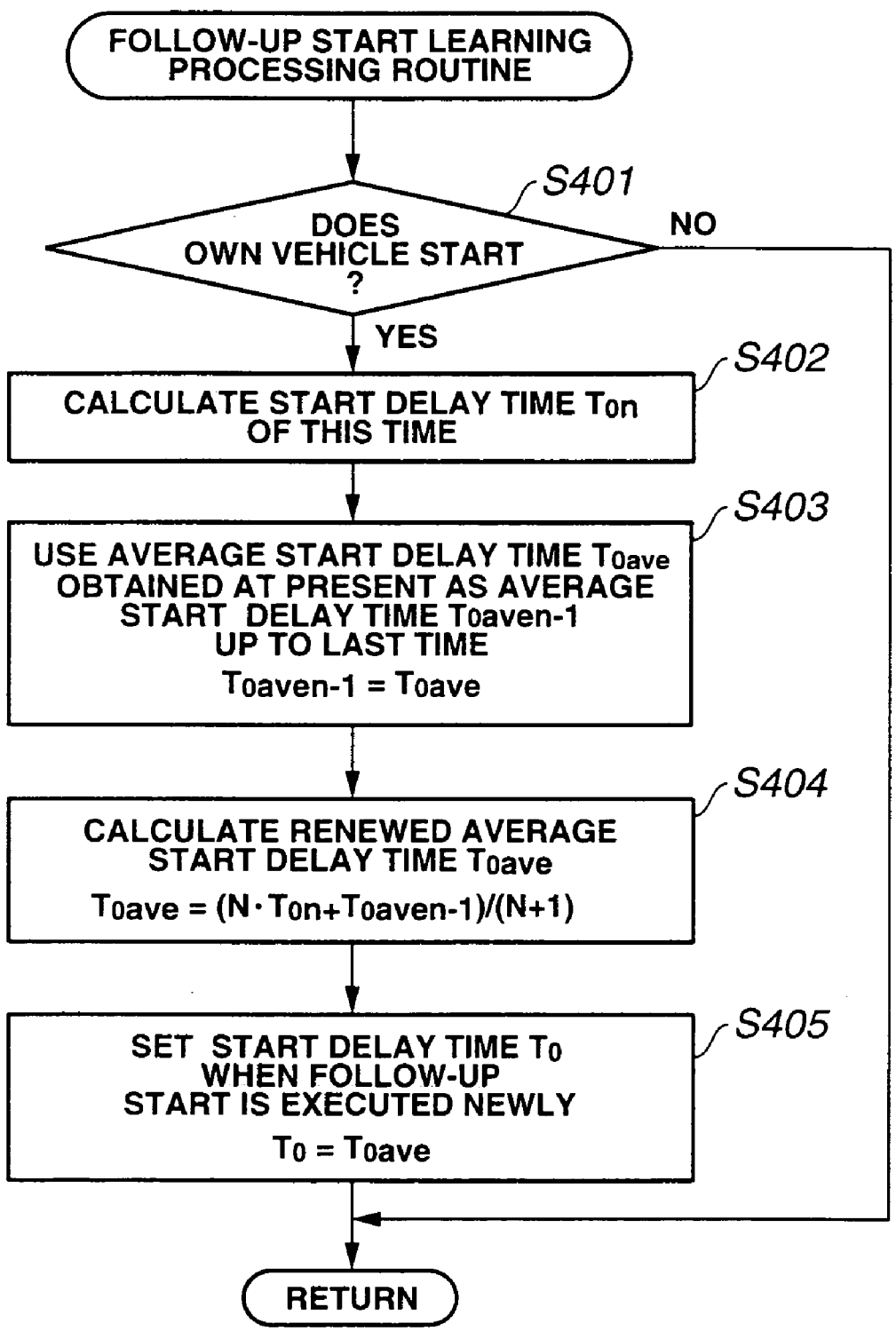
FIG. 7 shows the flowchart of a follow-up start learning processing routine.

As shown in FIG. 7, in the follow-up start learning processing executed at S107, first, whether or not the own vehicle 1 starts (subsequently to the preceding vehicle) is determined at S401, and when the own vehicle 1 does not start, the process exits from the routine as it is, whereas when the own vehicle 1 starts, the process goes to S402.

At S402, a start delay time $T_{0n}$ at this time is calculated, then the process goes to S403 at which an average start delay time $T_{0ave}$ obtained at the time (stored in a memory) is used as an average start delay time $T_{0aven-1}$ up to last time ($T_{0aven-1}=T_{0ave}$).

Next, the process goes to S404 at which a renewed average start delay time $T_{0ave}$ is calculated by, for example, the following weighted average.

$$T_{0ave}=(N \cdot T_{0n}+T_{0aven-1})/(N+1)$$

Then, the process goes to S405 at which a renewed start delay time distance $T_0$ at a follow-up start time is set as $T_{0ave}$ obtained at S404 ($T_0=T_{0ave}$), and the process exits from the routine.

In contrast, when the preceding vehicle does not start as a result of determination at S106, the process goes to S108 at which whether or not the preceding vehicle is accelerated (except when the preceding vehicle starts), and when the preceding vehicle is accelerated, the process goes to S109 at which follow-up acceleration learning processing is executed, and the process exits from the program.

As shown in FIG. 8, in the follow-up acceleration learning processing executed at S109, first, whether or not the own vehicle 1 is accelerated (subsequently to the preceding vehicle) is determined at S501, and when the own vehicle 1 is not accelerated, the process exits from the routine as it is, whereas when the own vehicle 1 is accelerated, the process goes to S502.

At S502, a map of the accelerating operation of the own vehicle 1, that is, a map of a controlled variable $T_{hx}$ of a throttle is created in terms of, for example, the relation between a preceding vehicle acceleration $a_{fwd}$ and the own vehicle speed $V_{own}$ ($T_{hx}=f(a_{fwd}, V_{own})$), learning processing is executed, and the process exits from the routine.

In contrast, when the preceding vehicle is not accelerated as a result of determination at S108, the process goes to S110 at which whether or not the preceding vehicle is decelerated (except when the preceding vehicle stops) is determined, and when the preceding vehicle is decelerated, the process goes to S111 at which follow-up deceleration learning processing is executed, and the process exits from the program.

As shown in FIG. 9, in the follow-up deceleration learning processing, first, whether or not the own vehicle 1 is decelerated (subsequently to the preceding vehicle) is determined at S601, and when the own vehicle 1 is not decelerated, the process exits from the routine as it is, whereas when the own vehicle 1 decelerated, the process goes to S602.

At S602, a map of the decelerating operation of the own vehicle 1, that is, a map of a controlled variable $B_{Pr}$ of a brake is created in terms of, for example, the relation between a preceding vehicle acceleration $a_{fwd}$ (or deceleration ($-a_{fwd}$)) and the own vehicle speed $V_{own}$ ($B_{Pr}=g(a_{fwd}, V_{own})$), learning processing is executed, and the process escapes from the routine.

In contrast, when the preceding vehicle is not decelerated as the result of determination at S110 described above, the process goes to S112 at which ordinary follow-up control learning processing is executed, and the process exits from the program.

Figure 10:
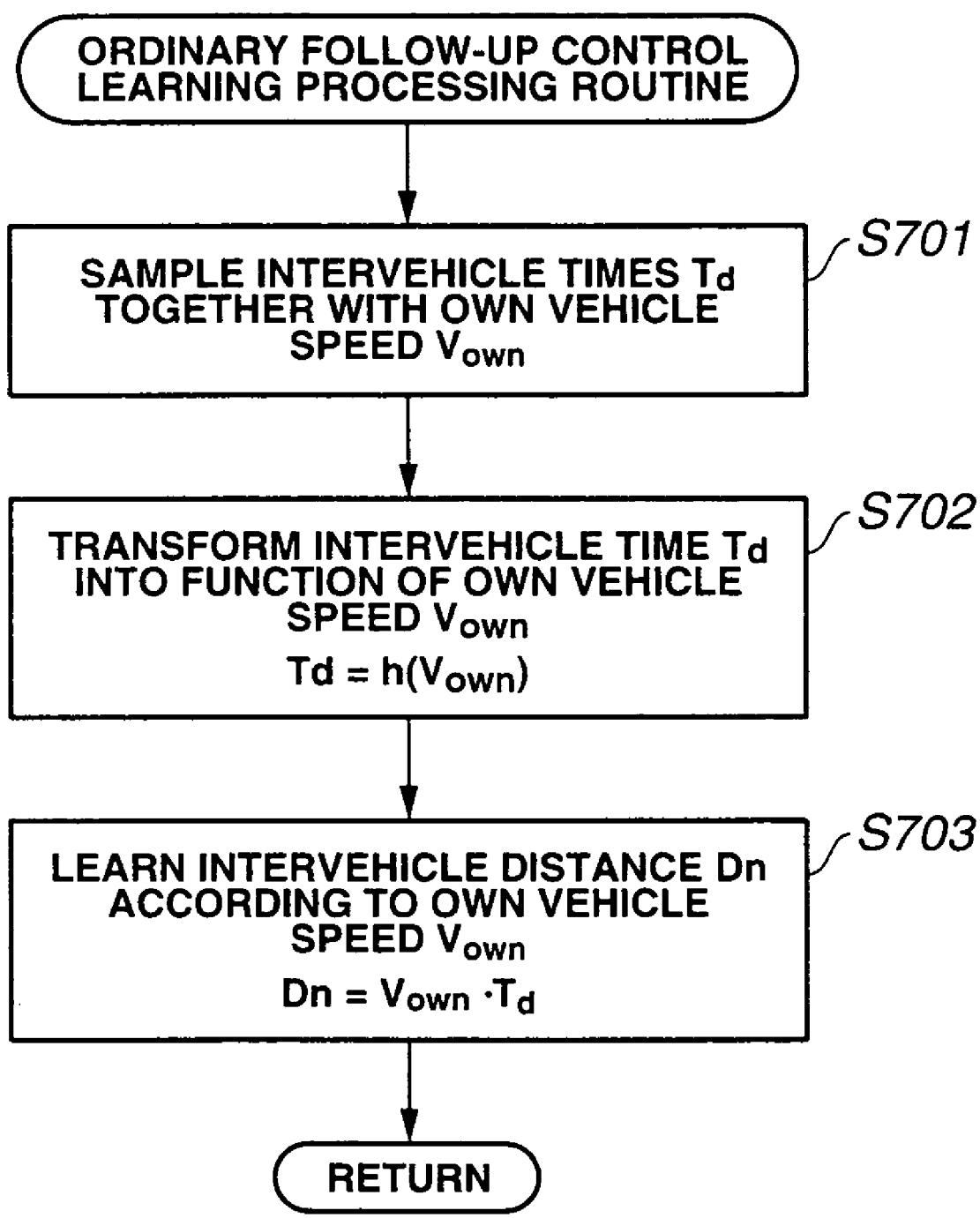
FIG. 10 shows the flowchart of an ordinary follow-up control learning processing routine.

As shown in FIG. 10, in the ordinary follow-up control learning processing, first, intervehicle times $T_d$ are sampled together with own vehicle speeds $V_{own}$ at S701.

Figure 14:
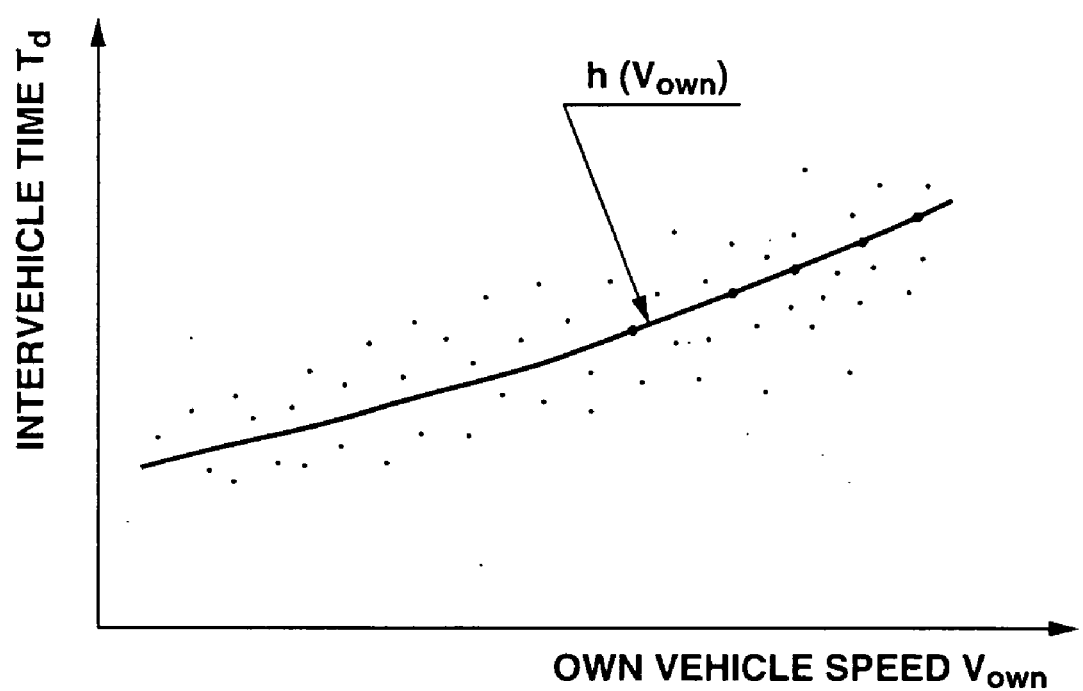
FIG. 14 is a view explaining an example of a relation between an intervehicle time and the speed of an own vehicle.

Then, the process goes to S702 at which an intervehicle time $T_d$ is transformed to the function of an own vehicle speed $V_{own}$ ($T_d=h(V_{own})$), and intervehicle times $T_d$ are learned for respective own vehicle speeds $V_{own}$. The intervehicle times $T_d$ are learned by, for example, plotting sampled intervehicle times $T_d$ on a map and calculating an approximate line segment passing through the plotted points as shown in FIG. 14.

Next, the process goes to S703 at which intervehicle distances $D_n$ according to the respective own vehicle speeds $V_{own}$ are previously determined by calculation and learned. At the time, the respective intervehicle distances Dn are calculated by an equation $D_n=V_{own} \cdot T_d$ using the learned intervehicle times $T_d$.

In contrast, when it is determined at S103 described above that the driver does not execute the follow-up driving to the preceding vehicle with reference to the result of determination at S102, the processing is executed at S113 and the subsequent steps.

Whether or not the main switch is turned on is determined at S113, and when the main switch is turned on, the process goes to S114 at which it is determined whether or not a control cancel signal, that is, a signal for turning on the brake switch 7 when the driver presses the brake or a signal for turning off a function for executing the automatic follow-up control exceeding an upper limit value preset to the own vehicle speed $V_{own}$ is not input.

When it is determined at S113 that the main switch is turned off or it is determined at S114 that the control cancel signal is input, the process exits from the program as it is to cancel the automatic follow-up control function.

Further, when the main switch is turned on at S113 and the control cancel signal is not input at S114, the process goes to S115 to execute the automatic follow-up control at which emergency determination/control processing is executed, and the process goes to S116.

Figure 11:
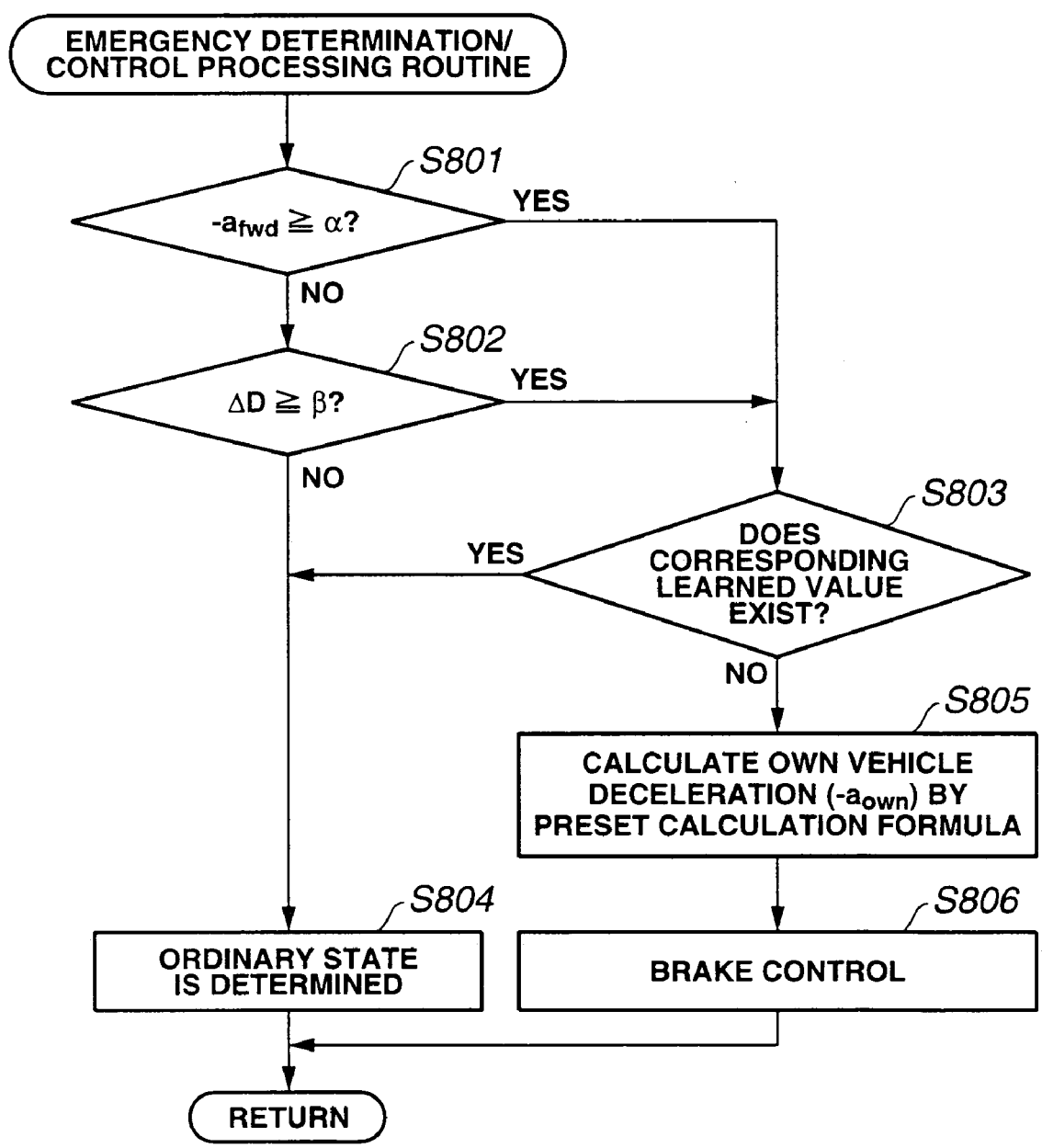
FIG. 11 shows the flowchart of an emergency determination/control processing routine.

As shown in FIG. 11, in the emergency determination/control processing executed at S115, first, whether or not the preceding vehicle decelerating speed ($-a_{fwd}$) is equal to or larger than a preset decelerating speed α at S801. When the preceding vehicle decelerating speed ($-a_{fwd}$) is less than the preset decelerating speed α ($-a_{fwd}<α$) as the result of determination at step S801, the process goes to S802 at which whether or not the change of intervehicle distance ΔD between the preceding vehicle and the own vehicle 1 is equal or larger than a preset value β. When the change of intervehicle distance ΔD between the preceding vehicle and the own vehicle 1 is less than the preset value β (ΔD<β) as the result of determination at S802, the process goes to S804 at which it is determined that the driver can ordinarily execute the automatic follow-up control in the state as it is because any preceding vehicle applies no emergency brake and any vehicle traveling ahead of the own vehicle 1 does not abruptly cut in, and then the process escapes from the routine.

In contrast, when it is determined at S801 that the preceding vehicle decelerating speed ($-a_{fwd}$) is equal to or larger than the preset deceleration α ($-a_{fwd} \geq α$), or when it is determined at S802 that the change of intervehicle distance ΔD between the preceding vehicle and the own vehicle 1 is less than the preset value β (ΔD≧β), the process goes to S803 at which whether or not a learned value corresponding to the driving state exists is determined, and when the learned value exists, the process goes to S804 because the driving state can be controlled by the learned value, it is determined at S804 that the automatic follow-up control can be ordinarily executed as it is, and the process escapes from the routine.

Further, when it is determined that the learned value corresponding to the driving state does not exist as the result of determination at S803, the process goes to S805 at which an own vehicle deceleration ($-a_{own}$) is calculated by the following preset calculation formula (otherwise, the own vehicle deceleration ($-a_{own}$) may be extracted from a map and the like), the process goes to S806 at which a brake control is executed to obtain the own vehicle deceleration ($-a_{own}$) calculated at S805, and the process escapes from the routine.

$$-a_{own}=V_{own}^2/(2\cdot(D-D_s)+(V_{fwd}^2/(-a_{fwd})))$$

where $D_s$ shows a target intervehicle distance preset according to the own vehicle speed $V_{own}$.

When the emergency determination/control processing described above is executed at S115, the process goes to S116 at which whether or not the preceding vehicle stops is determined, and when the preceding vehicle stops, the process goes to S117 at which the own vehicle 1 is decelerated based on the target intervehicle distance $D_0$, which is preset in the follow-up stop learning processing at S105 described above, at the time the follow-up control stops, thereby the own vehicle 1 is stopped while keeping the target intervehicle distance $D_0$ when the follow-up control is stopped, and the process exits from the program.

Further the preceding vehicle does not stop as the result of determination at S116, the process goes to S118 at which whether or not the preceding vehicle starts is determined, and when the preceding vehicle starts, the process goes to S119 at which the own vehicle 1 is started based on a start delay time $T_0$, which is preset in the follow-up start learning processing at S107 described above, at the time of a follow-up start, and the process exits from the program.

Further, when the preceding vehicle does not start as the result of determination at S118, the process goes to S120 at which whether or not the preceding vehicle is accelerated is determined, and when the preceding vehicle is accelerated, the process goes to S121 at which a follow-up acceleration control is executed based on the controlled variable $T_{hx}$ of throttle learned in the follow-up acceleration learning processing at S109 described above, and the process exits from the program.

Figure 12:
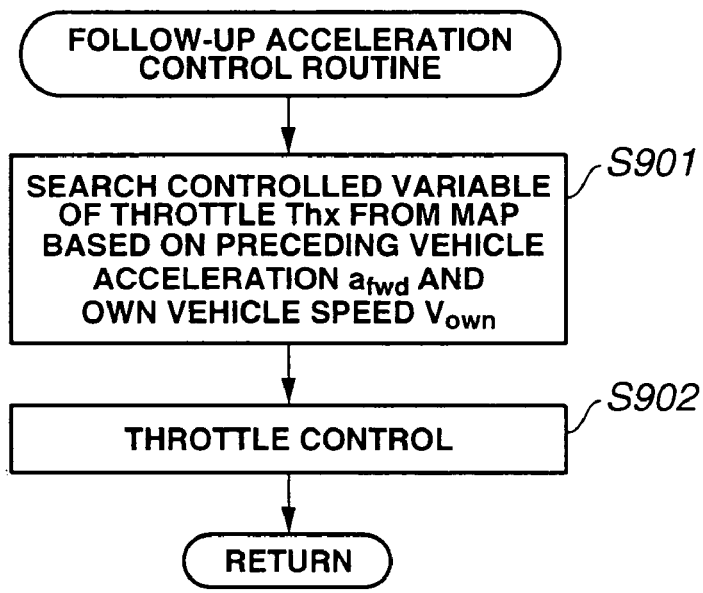
FIG. 12 shows the flowchart of a follow-up acceleration control routine.

Specifically, in the follow-up acceleration control executed at S121, the controlled variable $T_{hx}$ of the throttle is searched from a map at S901 based on the preceding vehicle acceleration $a_{fwd}$ and the own vehicle speed $V_{own}$ as shown in FIG. 12.

Then, the process goes to S902 at which a throttle control is executed based on the controlled variable $T_{hx}$ of the throttle searched at S901 described above, and the process escapes from the routine.

In contrast, when the preceding vehicle is not accelerated as the result of determination at S120, the process goes to S122 at which whether or not the preceding vehicle is decelerated is determined, and when the preceding vehicle is decelerated, the process goes to S123 at which a follow-up deceleration control is executed based on the controlled variable B Pr of the brake learned in the follow-up deceleration learning processing at S111 described above, and the process exits from the program.

Figure 13:
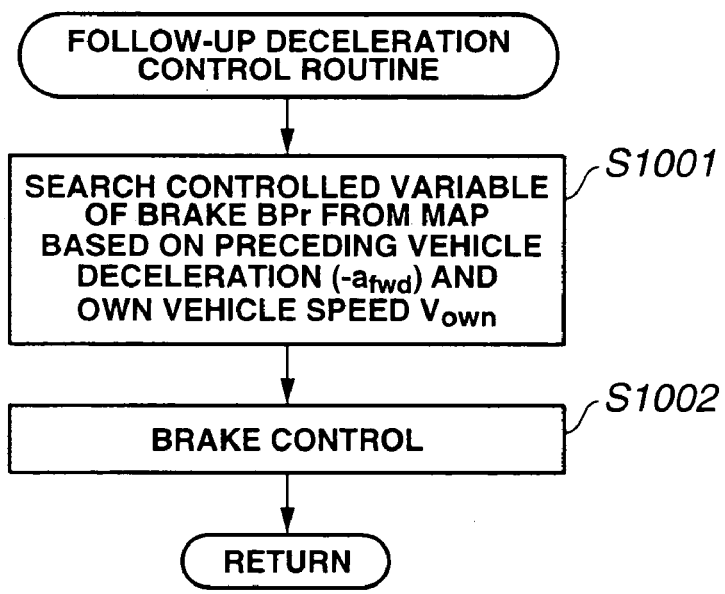
FIG. 13 shows the flowchart of a follow-up deceleration control routine.

Specifically, in the follow-up deceleration control executed at S123, the controlled variable B Pr of the brake is searched from the map at S1001 based on the preceding vehicle deceleration $(-a_{fwd})$ and the own vehicle speed $V_{own}$ as shown in FIG. 13.

Then, the process goes to S1002 at which a brake control is executed based on the controlled variable B Pr of the brake searched at S1001 described above, and the process exits from the routine.

In contrast, when it is determined that the preceding vehicle is not decelerated as the result of determination at S122, the process goes to S124 at which an ordinary automatic follow-up control is executed based on an intervehicle distance $D_n$ according to the own vehicle speed $V_{own}$ learned in the ordinary follow-up control learning processing at S112 described above, and the process exits from the program.

As described above, according to the embodiment of the present invention, whether or not the driver executes the follow-up driving is determined using the intervehicle time $T_d$. Accordingly, even if a preceding vehicle greatly changes its speed, it can be securely determined that the driver executes the follow-up driving, and further the determination can be promptly executed by reducing an amount of calculation. Further, since learning is executed based on the intervehicle distance $T_d$, accurate learned values can be obtained.

When it is determined that the driver executes the follow-up driving using the intervehicle time $T_d$, various parameters necessary to the automatic follow-up control (the target intervehicle distance $D_0$ when the follow-up control is stopped, the start delay time $T_0$ in the follow-up start, the controlled variable $T_{hx}$ of the throttle in the follow-up acceleration control, the controlled variable $B_{Pr}$ of the brake in the follow-up deceleration control, and the intervehicle distance $D_n$ according to the own vehicle speed $V_{own}$ in the ordinary automatic follow-up control) are learned. Accordingly, the automatic follow-up control can be executed using the accurate learned values, thereby a good drive feeling that reflects the preference and the habit of the driver can be obtained.

Further, the provision of the emergency determination/control processing at S115 makes it possible to execute the preferable automatic follow-up control that can sufficiently cope with, for example, the abrupt deceleration and the abrupt squeezing of a preceding vehicle.

Note that, a preceding vehicle is recognized based on the images from the stereoscopic camera in the embodiment, it may be recognized by other technologies, for example, based on information from the millimeter radar and the single lens camera.

Further, the automatic follow-up control of the embodiment shows the example that can cope with all of the follow-up stop control, the follow-up start control, the follow-up acceleration control, the follow-up deceleration control, and the ordinary automatic follow-up control. However, it is needless to say that a system which does not have all the functions can be applied.

As described above, according to the present invention, it is possible to learn necessary data accurately by a minimum amount of calculation and to execute the automatic follow-up control with a good drive feeling that reflects the preference and the habit of the driver.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle driving support apparatus for a vehicle traveling at a vehicle speed that executes an automatic follow-up control with respect to a preceding vehicle traveling ahead of the vehicle, comprising:
   preceding vehicle recognition means for recognizing the preceding vehicle and determining the intervehicle distance between the vehicle and the preceding vehicle based on at least an image of circumstances in a traveling direction of the vehicle.
   intervehicle time calculation means for calculating an intervehicle time by dividing the intervehicle distance between the vehicle and the preceding vehicle by the vehicle speed;
   driver follow-up driving determination means for determining that the vehicle is in a follow-up driving state executed by the driver when (i) the intervehicle time is set to a value within a set range, (ii) the intervehicle time continues within the set range for a set period of time and (iii) the automatic follow-up control is off;
   target control value learning means for obtaining driving information and learning a target control value of the automatic follow-up control based on the driving information generated when it is determined that the vehicle is in the follow-up driving state executed by the driver; and
   automatic follow-up control execution means for outputting an actuation signal to a predetermined actuating section based on the learned target control value when the automatic follow-up control is executed.

2. The vehicle driving support apparatus according to claim 1, wherein the target control value learning means learns the intervehicle time for each of the vehicle speeds and learns the intervehicle distance between the vehicle and the preceding vehicle for each vehicle speed from the learned intervehicle time.

3. The vehicle driving support apparatus according to claim 2, wherein the automatic follow-up control execution means sets the intervehicle distance learned by the target control value learning means as a target intervehicle distance and executes the automatic follow-up control by outputting an actuation signal to a predetermined actuating section based on said target intervehicle distance.

4. The vehicle driving support apparatus according to claim 3, wherein when it is determined that the vehicle is in the follow-up driving state executed by the driver, the target control value learning means learns a manipulated variable of the throttle manipulated by the driver when the preceding vehicle is accelerated and the vehicle is accelerated.

5. The vehicle driving support apparatus according to claim 4, wherein the automatic follow-up control execution means executes the automatic follow-up control by setting a controlled variable of the throttle of the vehicle when the preceding vehicle is accelerated based on a manipulated variable of the throttle learned by the target control value learning means.

6. The vehicle driving support apparatus according to claim 5, wherein when it is determined that the vehicle is in the follow-up driving state executed by the driver, the target control value learning means learns a manipulated variable of the brake manipulated by the driver when the preceding vehicle is decelerated and the vehicle is decelerated.

7. The vehicle driving support apparatus according to claim 6, wherein the automatic follow-up control execution means executes the automatic follow-up control by setting a controlled variable of the brake of the vehicle when the preceding vehicle is decelerated based on a manipulated variable of the brake learned by the target control value learning means.

8. The vehicle driving support apparatus according to claim 7, wherein the intervehicle time calculation means calculates the intervehicle time by presetting a lower limit value of the vehicle speed, and when it is determined that the vehicle is in the follow-up driving state executed by the driver, the target control value learning means learns the intervehicle distance between the vehicle and the preceding vehicle when the preceding vehicle stops and the vehicle stops.

9. The vehicle driving support apparatus according to claim 8, wherein the automatic follow-up control execution means executes the automatic follow-up control when the preceding vehicle stops based on the intervehicle distance between the vehicle and the preceding vehicle learned by the target control value learning means when the preceding vehicle stops and the vehicle stops.

10. The vehicle driving support apparatus according to claim 9, wherein the intervehicle time calculation means calculates the intervehicle time by presetting a lower limit value of the vehicle speed, and when it is determined that the vehicle is in the follow-up driving state executed by the driver, the target control value learning means learns a start delay time of the vehicle when the preceding vehicle starts and the vehicle starts.

11. The vehicle driving support apparatus according to claim 10, wherein the automatic follow-up control execution means executes the automatic follow-up control when the preceding vehicle starts based on the start delay time learned by the target control value learning means.

12. The vehicle driving support apparatus according to claim 11, wherein when the automatic follow-up control execution means executes the automatic follow-up control, the automatic follow-up control execution means executes a preset follow-up control in a driving control region in which a learned target control value does not exist.

13. The vehicle driving support apparatus according to claim 1, wherein when it is determined that the vehicle is in the follow-up driving state executed by the driver, the target control value learning means learns a manipulated variable of a throttle manipulated by the driver when the preceding vehicle is accelerated and the vehicle is accelerated.

14. The vehicle driving support apparatus according to claim 13, wherein the automatic follow-up control execution means executes the automatic follow-up control by setting a controlled variable of the throttle of the vehicle when the preceding vehicle is accelerated based on a manipulated variable of the throttle learned by the target control value learning means.

15. The vehicle driving support apparatus according to claim 1, wherein when it is determined that the vehicle is in the follow-up driving state executed by the driver, the target control value learning means learns a manipulated variable of a brake manipulated by the driver when the preceding vehicle is decelerated and the vehicle is decelerated.

16. The vehicle driving support apparatus according to claim 15, wherein the automatic follow-up control execution means executes the automatic follow-up control by setting a controlled variable of the brake of the vehicle when the preceding vehicle is decelerated based on a manipulated variable of the brake learned by the target control value learning means.

17. The vehicle driving support apparatus according to claim 1, wherein the intervehicle time calculation means calculates the intervehicle time by presetting a lower limit value of the vehicle speed, and when it is determined that the vehicle is in the follow-up driving state executed by the driver, the target control value learning means learns the intervehicle distance between the vehicle and the preceding vehicle when the preceding vehicle stops and the vehicle stops.

18. The vehicle driving support apparatus according to claim 17, wherein the automatic follow-up control execution means executes the automatic follow-up control when the preceding vehicle stops based on the intervehicle distance between the vehicle and the preceding vehicle learned by the target control value learning means when the preceding vehicle stops and the vehicle stops.

19. The vehicle driving support apparatus according to claim 1, wherein the intervehicle time calculation means calculates the intervehicle time by presetting a lower limit value of the vehicle speed, and when it is determined that the vehicle is in the follow-up driving state executed by the driver, the target control value learning means learns a start delay time of the vehicle when the preceding vehicle starts and the vehicle starts.

20. The vehicle driving support apparatus according to claim 19, wherein the automatic follow-up control execution means executes the automatic follow-up control when the preceding vehicle starts based on the start delay time learned by the target control value learning means.

21. The vehicle driving support apparatus according to claim 1, wherein when the automatic follow-up control execution means executes the automatic follow-up control, the automatic follow-up control execution means executes a preset follow-up control in a driving control region in which a learned target control value does not exist.

22. A vehicle driving support apparatus for a vehicle traveling at a vehicle speed that executes an automatic follow-up control with respect to a preceding vehicle traveling ahead of the vehicle, comprising:
a speed sensor for sensing the speed of the vehicle while traveling in a direction;
a distance measuring device, said distance measuring device measuring an intervehicle distance between the vehicle and a preceding vehicle traveling in the direction of the vehicle; and
a control unit, said control unit (a) calculating an intervehicle time by dividing the intervehicle distance by the vehicle speed, (b) determining that the apparatus is in a follow-up driving state executed by the driver based on (i) the intervehicle time being set to a value within a set range, (ii) the intervehicle time continuing within the set range for a set period of time and (iii) the automatic follow-up control being off, (c) obtaining driving information and learning a target control value of the automatic follow-up control based on the driving information when it is determined that the apparatus is in the follow-up driving state executed by the driver; and (d) outputting an actuation signal to a predetermined actuating section based on the learned target control value when the automatic follow-up control is turned on.

* * * * *